E. V. ANDERSON.
VALVE MECHANISM.
APPLICATION FILED OCT. 22, 1908.

917,740.

Patented Apr. 6, 1909.
4 SHEETS—SHEET 2.

WITNESSES:

INVENTOR

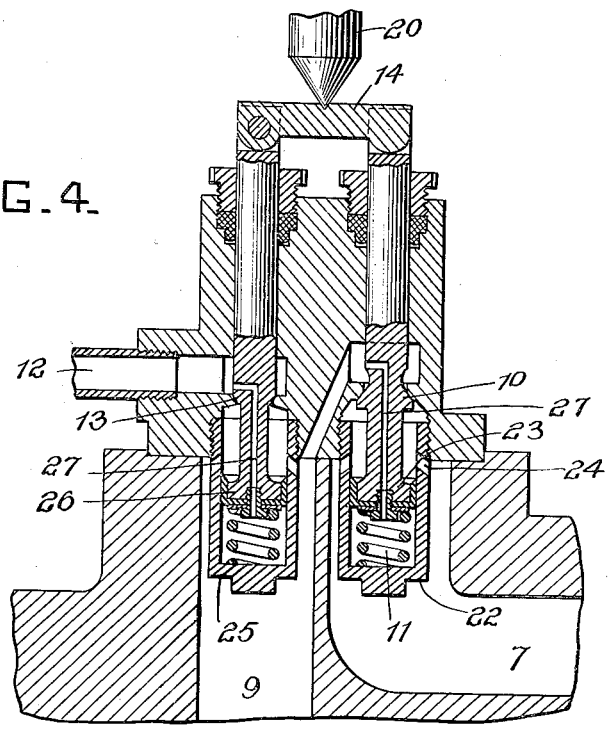
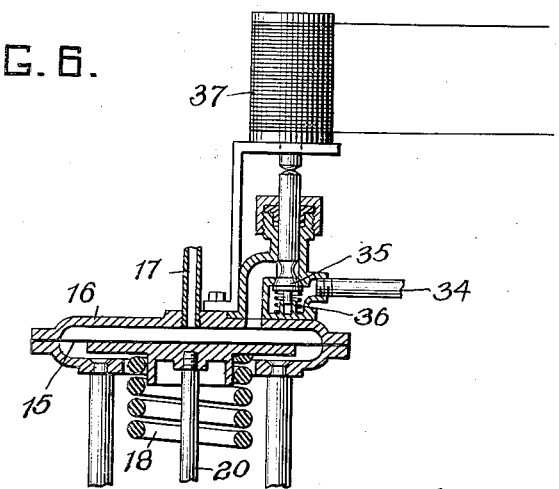

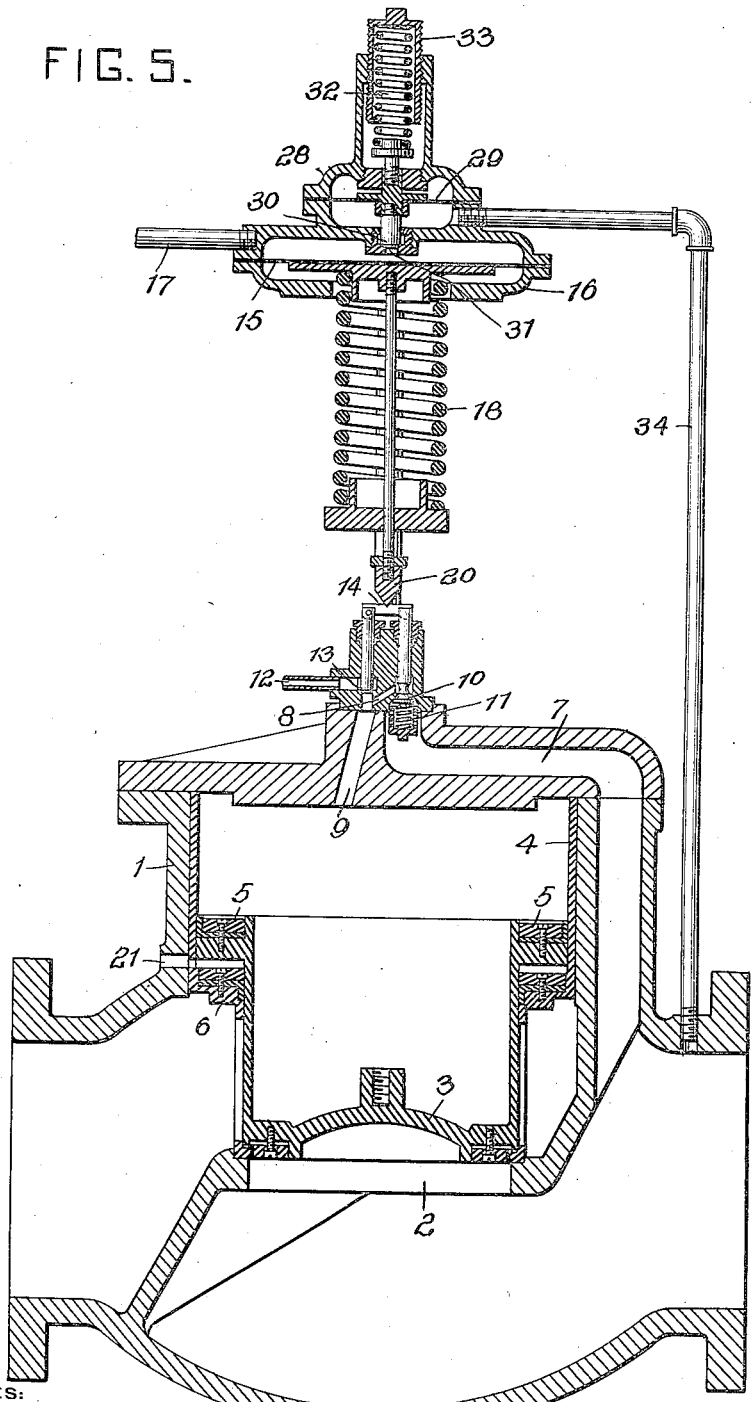

UNITED STATES PATENT OFFICE.

EDWARD V. ANDERSON, OF MONESSEN, PENNSYLVANIA, ASSIGNOR, BY DIRECT AND MESNE ASSIGNMENTS, TO GOLDEN-ANDERSON VALVE SPECIALTY COMPANY, OF PITTSBURG, PENNSYLVANIA, A CORPORATION OF PENNSYLVANIA.

VALVE MECHANISM.

No, 917,740.     Specification of Letters Patent.     Patented April 6, 1909.

Application filed October 22, 1908. Serial No. 459,045.

*To all whom it may concern:*

Be it known that I, EDWARD V. ANDERSON, residing at Monessen, in the county of Westmoreland and State of Pennsylvania, a citizen of the United States, have invented or discovered certain new and useful Improvements in Valve Mechanism, of which improvement the following is a specification.

The invention described herein relates to improvements in valve mechanism for controlling the height of water in tanks, reservoirs, etc., and has for its object a construction whereby when the water in the tank, etc., has reached a predetermined height the flow is cut off by the weight of the fluid column in the tank, but will be restored as soon as such fluid column has decreased to a certain extent.

It is a further object of the invention to provide for means to prevent the flow of water to the tank regardless of the level of the water therein, such cutting off of the flow being effected by manually controlled means or automatically on an increase of pressure in the supply pipes.

The invention is hereinafter more fully described and claimed.

Figure 1:
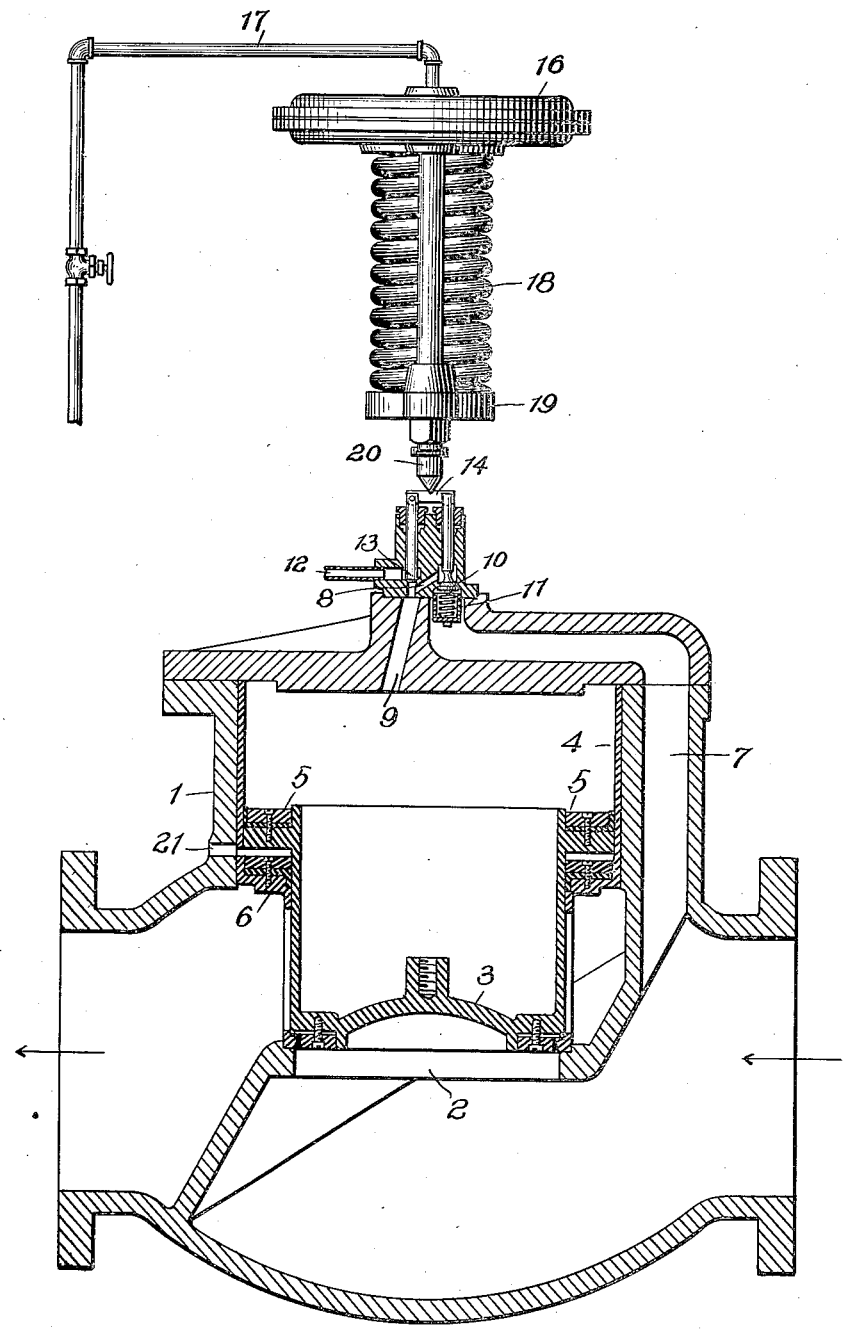
Figure 2:
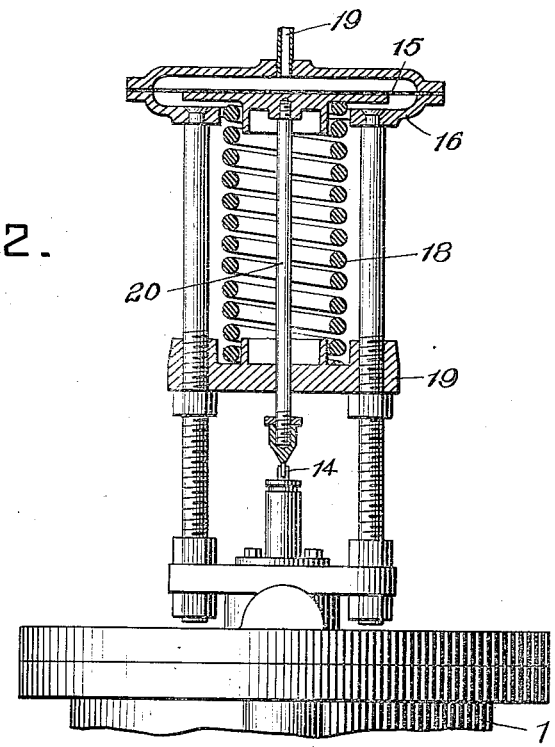
Figure 3:
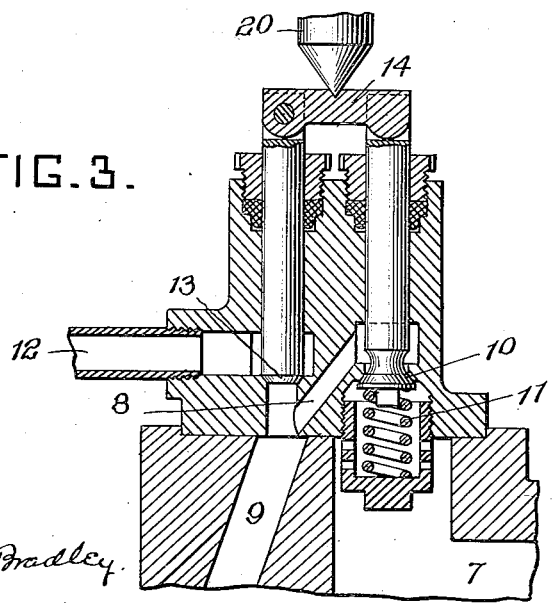

In the accompanying drawings forming a part of this specification Figure 1 is a sectional elevation of my improved valve mechanism; Fig. 2 is a sectional view of the upper portion of the valve mechanism shown in Fig. 1, and Fig. 3 is a sectional detail view of the auxiliary valves controlling the main valve; Fig. 4 is a view similar to Fig. 3 illustrating a modified form of the controlling valves; Fig. 5 is a view similar to Fig. 1 showing an automatic arrangement for cutting off the flow to the tank, and Fig. 6 is a detail view showing an electrically controlled means for closing the main valve in the supply pipe.

In the practice of my invention, the casing 1 is provided with a diaphragm 2 having an opening therethrough for the flow of water to the tank. This casing is so connected to the supply pipe and tank that the pressure of the water flowing to the tank will force from its seat a valve 3 controlling the opening in the diaphragm. This valve is made in the form of a piston, the upper portion thereof fitting within a cylinder 4 having its axis coincident with the axis of the opening through the diaphragm. The cylinder is made of a diameter greater than the diameter of the opening through the diaphragm, and the piston is provided with an outwardly extending flange 5 fitting within the cylinder and forming a tight joint with the walls thereof. The lower end of the cylinder is closed by an annular head 6 provided with a suitable packing to form a tight joint with the piston.

The valve casing is provided with a passage 7 extending from the inlet side of the diaphragm along and across the top of the cylinder, said passage being connected by a port 8 to a passage preferably formed in the head of the cylinder 4, and connecting with the interior of the latter. The flow of water from the passage 7 to the passage 8 is controlled by a valve 10 seating in the direction of the flow of the water in the passage 7, and also preferably held to its seat by a spring 11. The passage 9 is also connected to an exhaust passage 12. The connection between the passages 9 and 12 is controlled by a valve 13, which seats against the pressure of the water in the cylinder so that when free to move it may be forced open by such pressure.

The valves 10 and 13 are constantly subjected to the pressure of the fluid column in the tank or reservoir, such pressure tending to force the valve 10 from its seat and to close the valve 13. This pressure is preferably exerted through a diaphragm 15 arranged in the case or shell 16, having the portion above the diaphragm connected by a pipe 17 to the lower portion of the tank or reservoir. The pressure of the fluid column is counterbalanced to a certain extent by a spring 18 bearing at one end against the underside of the diaphragm and its opposite end on the adjustable head 19. The diaphragm operates on the valves through a rod 20 secured to the diaphragm and bearing at its lower end on a cross bar 14 bearing on the stems of the valves 10 and 13. It is preferred that this cross bar should be connected by a pin to one of the stems, as that of the valve 13, so as to prevent its accidental displacement. It will be observed that the relative arrangement of the rod 20, cross bar 14 and valves 10 and 13 is such that when the rod is forced down by pressure in the tank, the stem of valve 13 will operate as a fulcrum for the bar or lever 14. But when the rod 20 is moved by the spring 18 its lower end will act as a fulcrum, and the valve 13 will be held closed until valve 10 is closed, otherwise it might happen that both valves would be open simultaneously and remain in such position.

When the water in the tank or reservoir reaches a predetermined height, the pressure of the fluid column exerted on the diaphragm will be sufficient to force the valves 10 and 13 downwardly thereby closing the exhaust valve 13 and opening the inlet valve 10. Water will then flow by the passages 7, 8 and 9 into the cylinder 4 and thereby force the piston valve 3 to its seat, closing the opening through the diaphragm 2. As soon as the height of the fluid column in the tank or reservoir is reduced to a predetermined point, determined by the adjustment of the head 19, the spring 18 will force the diaphragm up, thereby permitting the valve 10 to be closed by its spring 11 and the pressure of water in passage 7 and the valve 13 to be opened by the pressure of fluid in the cylinder. As the water escapes from the cylinder 4 the pressure on the underside of the piston valve 3 will force the latter from its seat, and water will flow into the tank or reservoir. In its upward movement the piston valve draws in air between the flange and lower head through the port 21 so as to provide an air cushion when the piston valve is again returned to its seat by the pressure of water in the cylinder 4. As soon as the water attains the desired height in the tank or reservoir, the pressure on the diaphragm 15 will again shift the valves 10 and 13, opening the former and closing the latter, so that water will flow into the cylinder 4 and force the piston valve to its seat.

As shown in Fig. 4 the valves 10 and 13 controlling the flow to and from the cylinder 4 may be balanced. This is effected in the case of valve 10 by extending the cage cylinder 22 containing the spring 11, and connecting a piston 23 to the valve 10, said piston operating in the portion of the cage below the inlet ports 24. In the case of the valve 13, a shell or cylinder 25 is arranged in the passage 9 for the reception of a piston 26 connected to the valve 13, while the pistons 23 and 26 are provided with suitable packing, water may escape into the lower ends of the cylinders 22 and 25, and hence provision is made for the escape of such water through passages 27.

This apparatus when in use is so adjusted as regards the normal pressure on the inlet side of the valve 1 that the pressure of a predetermined water column in the tank will hold the valve 13 to its seat as against the pressure exerted by the water in the supply pipe against the underside of the valve 3. When however the pressure on the inlet side of the valve 1 is materially increased, the unseating pressure exerted on the valve 3 will force the valve 13 open and allow the water to escape and the valve 3 to open. In order to prevent an overflow of the tank due to such increase of pressure on the supply side of the valve 3, provision is made as shown in Fig. 5 for preventing the opening of the valve 3 on such increase of pressure. In this construction a shell 28 is supported on top of the shell 16 and within this shell is arranged a diaphragm 29 carrying a valve 30 adapted to control a port 31 leading from the underside of the diaphragm 29 to the chamber in casing 16 above diaphragm 15. The valve 30 is held to its seat by means of a spring 32 whose tension can be regulated by an adjustable sleeve 33. The portion of the casing 28 beneath the diaphragm 29 is connected by a pipe 34 to the inlet side of the main valve 1. The spring 32 is adjusted to such tension by the sleeve 33 that under normal pressures on the inlet side of the main valve 3 the spring will hold the valve 30 to its seat closing the port 31, but in case of a material increase of pressure in the supply pipe the diaphragm 29 will be raised unseating the valve 30 and permitting such increased pressure to operate on the diaphragm 15 in addition to the pressure due to the water column in the tank operating through the pipe 17. It will be readily understood that the pressure exerted through the pipe 34 on the diaphragm 15 controlling the valve 13 will always be proportional to the unseating pressure exerted on the valve 3, and will hold such valve to its seat.

In lieu of the automatic arrangement shown in Fig. 5 provision may be made for causing an increased pressure in the supply pipe to operate directly upon the diaphragm 15. In this construction a valve 35 is arranged controlling the flow from the pipe 34 into the chamber above the diaphragm 15. This valve is constructed to seat with the pressure in the pipe 34 and is also preferably pushed toward its seat by a spring 36. The stem of this valve is connected to or operated on by an electro-magnet 37 preferably of the solenoid type, such electro-magnet being included in the circuit leading to the pumping house and controlled by a switch therein. When an increased pressure is desired in the supply pipes as in the case of fire, the engineer in charge of the pumping station will close the circuit, thereby opening the valve 35, so that when an increased pressure is produced in the supply pipe such pressure will operate on top of the diaphragm 15 and hold the valve 10 to its seat as against any pressure exerted on the valve 3 to unseat the latter.

I claim herein as my invention:

1. A valve mechanism having in combination a casing or shell provided with a transverse diaphragm having an opening therethrough, a cylinder integral with the casing and having its axis coincident with the center of the opening in the diaphragm, a piston valve arranged in the cylinder and adapted to close the opening through the diaphragm, the cylinder being connected to the inlet side of the casing, a spring seated valve controlling such connection, a valve controlling the exhaust from the cylinder and seating against pressure in the cylinder, and a diaphragm subjected to fluid pressure and adapted to simultaneously shift both valves to open and closed positions respectively.

2. A valve mechanism having in combination a main valve controlling the flow of fluid, a cylinder and piston for seating such valve, the cylinder being connected to the supply side of the main valve and having an exhaust port, valves controlling the inlet and exhaust passages of the cylinder, a spring for seating one valve and means operated by said valve for seating the other controlling valve.

3. A valve mechanism having in combination a main valve controlling the flow of fluid, a cylinder and piston for seating such valve, the cylinder being connected to the supply side of the main valve and having an exhaust port, valves controlling the inlet and exhaust passages of the cylinder one of said valves being movable to closed position by supply pressure, and means operative by said valve for seating the other controlling valve, and means controlled by fluid pressure on the delivery side of the main valve for controlling both valves.

4. A valve mechanism having in combination a main valve controlling the flow of fluid, a cylinder and piston for seating said valve, the cylinder being connected to the supply side of the main valve and having an exhaust passage, valves controlling the inlet and exhaust passages, means operative by fluid pressure on the delivery side for controlling said valves, and means operative by fluid pressure on the supply side of the main valve for holding the exhaust valve in closed position.

5. A valve mechanism having in combination a main valve controlling the flow of fluid, a cylinder and piston for seating said valve, the cylinder being connected to the supply side of the main valve and having an exhaust passage, valves controlling the inlet and exhaust passages, means operative by fluid pressure on the delivery side of the main valve for controlling said valves, and means operative on an increase above a predetermined point of fluid pressure on the supply side of the main valve for holding the exhaust valve closed and the inlet valve open.

In testimony whereof, I have hereunto set my hand.

EDWARD V. ANDERSON.

Witnesses:
CHARLES BARNETT,
J. HERBERT BRADLEY.